US008255094B2

(12) United States Patent
Srinivasan et al.

(10) Patent No.: US 8,255,094 B2
(45) Date of Patent: Aug. 28, 2012

(54) ON-DEMAND FLIGHT DATA SERVICE (75) Inventors: Thiru Srinivasan, Highlands Ranch, CO (US); Mike Abbott, Littleton, CO (US); Samuel Gilliss, Parker, CO (US); Scott Reagan, Littleton, CO (US)

(73) Assignee: The Boeing Company, Chicago, IL (US)

( * ) Notice: Subject to any disclaimer, the term of this patent is extended or adjusted under 35 U.S.C. 154(b) by 1567 days.

(21) Appl. No.: 11/685,880

(22) Filed: Mar. 14, 2007

(65) Prior Publication Data
US 2008/0228330 A1 Sep. 18, 2008

(51) Int. Cl.
*G01C 21/00* (2006.01)
(52) U.S. Cl. .......................... 701/3; 340/945
(58) Field of Classification Search .............. 701/3, 13, 701/14, 29, 35, 29.1, 32.3; 455/73, 431; 340/945, 961, 971, 825.69, 825.72; 375/219, 375/220; 342/33, 34, 36
See application file for complete search history.

(56) References Cited

U.S. PATENT DOCUMENTS

| 4,642,775 | A | * | 2/1987 | Cline et al. .................... 701/200 |
| 5,974,349 | A | * | 10/1999 | Levine ............................ 701/29 |
| 7,194,523 | B2 | * | 3/2007 | Nelson et al. ................. 709/218 |
| 7,359,703 | B2 | * | 4/2008 | McGuffin et al. ............. 455/431 |
| 7,471,995 | B1 | * | 12/2008 | Robinson .......................... 701/3 |
| 7,599,691 | B1 | * | 10/2009 | Mitchell ....................... 455/431 |
| 2007/0088467 | A1 | * | 4/2007 | Knotts ........................... 701/14 |

* cited by examiner

Primary Examiner — Dalena Tran
(74) Attorney, Agent, or Firm — Parsons Behle & Latimer (57) ABSTRACT A flight data service subscription system allows personnel to subscribe to flight data services using an electronic devices such as a multifunctional display (MFD) onboard an aircraft. The MFD is used to select regional areas of coverage and generate requests for subscriptions to flight data services. Flight data application software running on the MFD manages flight data and the subscription requests. A server operated by a flight data service provider receives the subscription requests from the MFD and dispatches flight data responsive to the requests for the selected region. A wireless local area network on the ground transfers flight data and subscription requests between the MFD and the flight data subscription server.

22 Claims, 6 Drawing Sheets

ON-DEMAND FLIGHT DATA SERVICE

TECHNICAL FIELD

This disclosure generally relates to the ordering, delivery, and installation of flight data in cockpit devices for aircraft, and deal more particularly with a system for subscribing to flight data services using the cockpit devices.

BACKGROUND

Various electronic instruments and devices used in commercial aircraft utilize flight data obtained from and updated by a flight data service provider. Flight data may include a variety of information in varying formats, including, for example, navigation charts, weather data, airport information, routing, schedules and the like. Multi-functional displays (MFDs) and Electronic Flight Bags (EFBs) are typical of electronic display systems intended primarily for cockpit/flightdeck or cabin use to display a variety of aviation data and perform basic calculations. Currently, according to FAA regulations, Class 1 and 2 EFBs are considered Portable Electronic Devices (PEDs), while Class 3 EFB systems are considered as installed equipment.

Presently, pilots may subscribe to flight data services either by making a telephone call request to the flight data service provider or by transmitting a request to an online web store hosted by the service provider. After the subscription is booked by the service provider's ERP (Enterprise Resources Planning) system, the pilot may download the data onto media using a PC and USB devices. The pilot may then transport the media to the cockpit, where it is used to install the flight data in MFDs or Tablet PCs, for example. The subscription process described above is not only time consuming, but requires the use of physical media that may be damaged in transport, rendering the media unusable for flight use.

Accordingly, there is a need for a flight data subscription system that simplifies the subscription process and reduces reliance on the use of physical media. The present embodiment is intended to satisfy this need.

SUMMARY

Illustrated embodiments of the disclosure provide a flight data subscription system that allows flight crews to subscribe to desired flight data services from the cockpit/flightdeck or cabin of the aircraft. Flight data subscriptions and updates may be transferred directly from the service provider to onboard electronic devices without the need for physical storage media. The onboard electronic devices using the flight data are registered with the service provider so that the service provider can control the ordering and delivery of flight data and insure that the proper data is delivered only to a registered onboard device.

In accordance with one embodiment, a method is provided for installing flight data into a cockpit device onboard an aircraft. The method comprises the steps of: transmitting a request for flight data from the aircraft to a local area network on the ground; transferring the request from the local area network to a flight data service provider; transmitting the flight data from the flight data service provider to the local area network; and, transmitting flight data to the cockpit device using the local area network. The local area network may comprise, for example, a wireless data link, such as one conforming to IEEE 802. The method further includes the step of selecting a geographic region to which the flight data pertains so that the request for flight data is restricted to the selected geographic region. The method may also include the steps of registering the cockpit device with the service provider, installing a flight data service software application on the registered cockpit device and using the software application to generate the request for flight data. The flight data service software application may be installed either by the Original Equipment Manufacturer (OEM) of the cockpit device, or by the OEM of the aircraft at the time the device is installed in the aircraft.

According to another embodiment of the disclosure, a method provides flight data subscriptions to aircraft comprising the steps of: registering a device onboard an aircraft with a flight data service provider; using the device to generate a request for flight data; transmitting the request to a local area network on the ground; forwarding the request from the local area network to the flight data service provider; transmitting, in response to the request for services, the requested flight data from the flight data service provider to the local area network; and, transmitting the requested flight data from the local area network to the device onboard the aircraft. The request for flight data may be transmitted to the service provider using the Internet, and the requested flight data may be transferred from the service provider to the local area network using Internet.

According to still another embodiment, a flight data service subscription system is provided, comprising: a device onboard the aircraft for displaying flight data and for generating a request for subscriptions to flight data services; flight data application software running on the device for managing flight data and flight data subscription requests; a flight data service server controlled by a flight data service provider for receiving subscription requests from the device and for dispatching flight data responsive to the requests; and, a wireless local area network on the ground for transferring flight data and subscription requests between the device and the flight data subscription server. The device may comprise a multi-functional cockpit display or a portable personal computer. The system may further include a ground based server connected with the local area network that is coupled with the flight data service server through the Internet. The local area network may include a wireless data link conforming to IEEE 802 that connects the device with the ground based server. The onboard device may include stored maps, means for recalling and displaying the maps, means for selecting regions of the maps for which flight data is desired, and means for generating subscription requests for flight data corresponding to the selected regions.

Other features, benefits and advantages of the disclosed embodiments will become apparent from the following description of embodiments, when viewed in accordance with the attached drawings and appended claims.

BRIEF DESCRIPTION OF THE ILLUSTRATIONS

DETAILED DESCRIPTION

Figure 1:
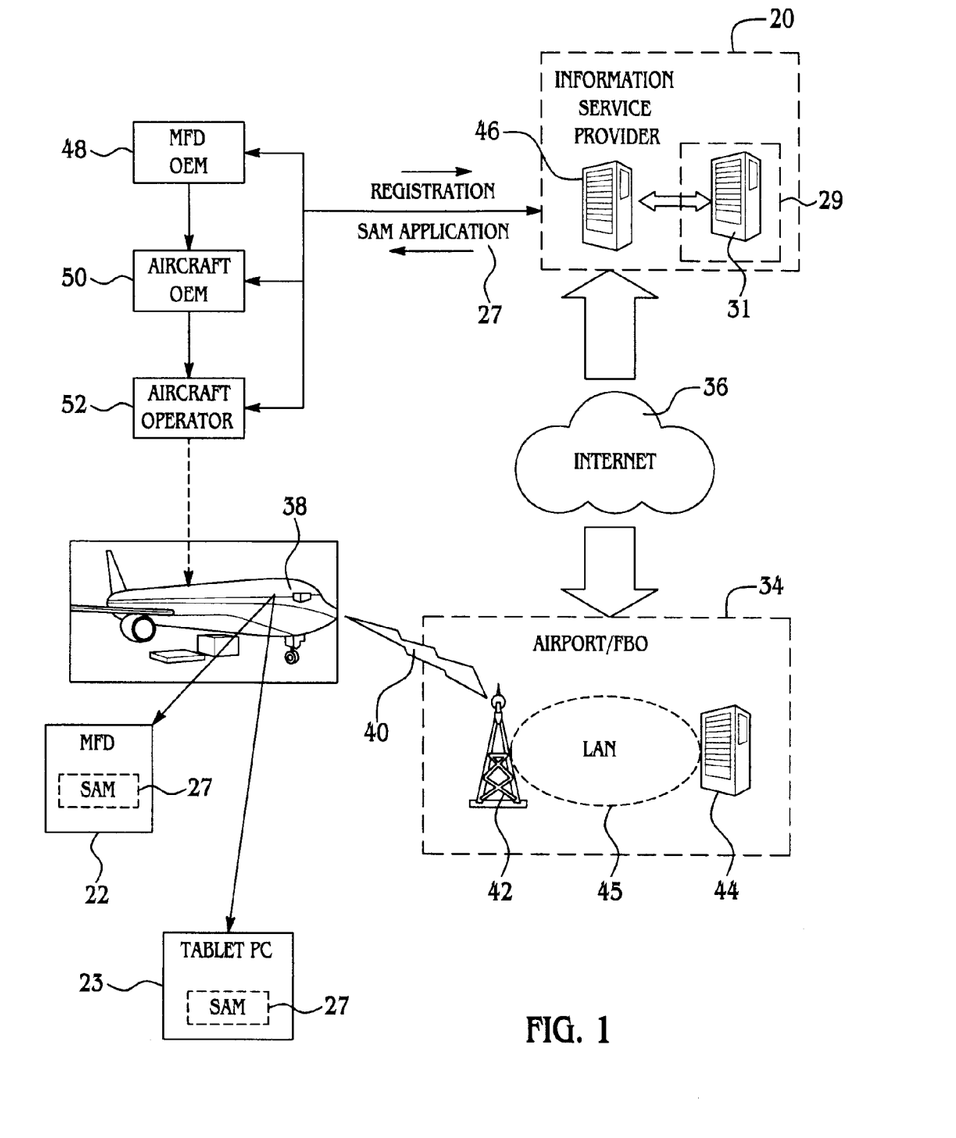
FIG. 1 is a combined block and diagrammatic illustration of a flight data service subscription system.
Figure 2:
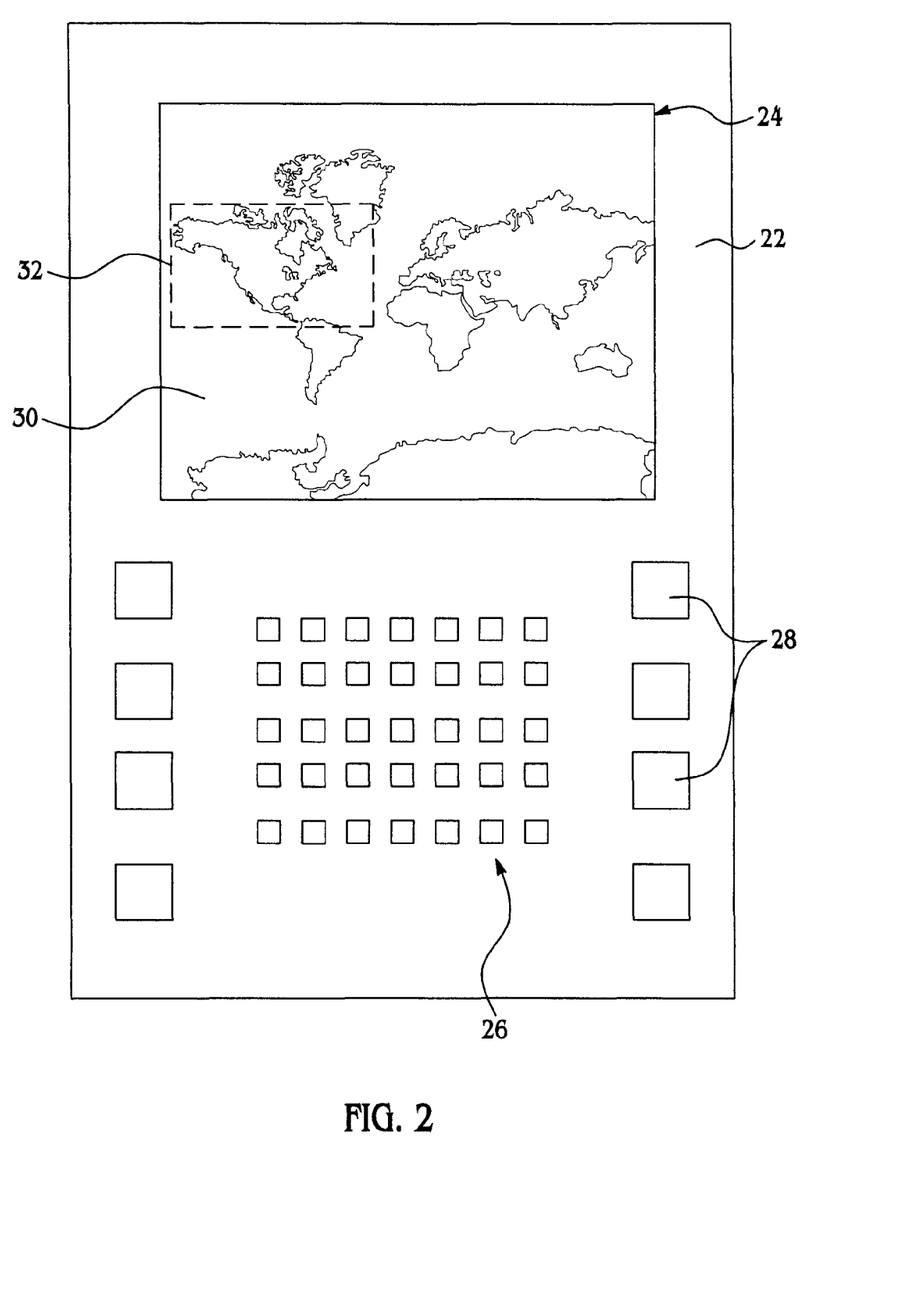
FIG. 2 is a plan illustration of an MFD displaying a map used to select the subscription region.

Referring first to FIGS. 1 and 2, embodiments of the disclosure provide on-demand subscription activation for data services directly from electronic devices onboard an aircraft 38, such as MFDs 22 or a Tablet PC 23. The subscription to data services is provided by an information or data service provider 20, where subscription activation and management, as well as data services are controlled by a server 46. The service provider 20 hosts a website 29 that includes a website server 31 that can be accessed through the Internet 36 by a local server located at an airport or FBO (Fixed Base Operator) 34. Server 44 is connected to a Local Area Network (LAN) 45 at the airport 34. Transceivers 42 on the LAN 45 provide a wireless data link 40 to aircraft 38 at the airport 32. The data link 40 may form part of a Wi-Fi, ground-based network at the airport 32, which may conform, for example, to the IEEE 802.XX standard.

As shown in FIG. 2, the MFD 22 may comprise any of several well known electronic displays that aid the crew on the flight deck of the aircraft 38 in reviewing flight data, such as chart information and performing calculations useful in navigating and piloting the aircraft 38. The MFD 22 typically includes an electronic display 24, a series of data entry keys 26, and optionally, function keys 28. In the example illustrated in FIG. 2, the display 24 shows a geographic map 30 in which the operator has selected a particular geographic region 32, which, in this case, is an area that generally encompasses North America. The MFD 22 and Tablet PC 23 each may include a wireless radio transceiver which may connect directly to the LAN 45 through the Wi-Fi data link 40. Alternatively, the MFD 22 and Tablet PC 23 may be coupled with an LAN (not shown) onboard the aircraft 38, which in turn includes a transceiver that communicates via the data link 40 to the ground based LAN 45.

In accordance with embodiments of the disclosure, data services may be ordered directly from the MFD 22 or Tablet PC 23 onboard the aircraft 38 when the aircraft 38 is within transmission range of the LAN 45 at the airport 34. As will described later in more detail, personnel onboard the aircraft 38 may order data services from the information service provider 20 for selected geographic regions. This is accomplished by the operator calling up a map 30 on the MFD 22 or Tablet PC 23, and then selecting a region, such as the North American region 32 shown in FIG. 2, for which the pilot or navigator wishes to obtain flight information. This flight information will typically include, without limitation, navigational charts, airport information, weather information, scheduling data and similar types of data and information. For airport information, based on the region selected, a list of airports may be displayed from which the pilot or navigator will choose a particular airport. The request for data services for the selected region/information is transmitted via the data link 40 to the LAN 45 and is received by server 44. Server 44 establishes a connection through the Internet 36 to the service provider's server 46. Server 46 verifies that the requesting MFD 22 or Tablet PC 23 has a valid subscription for data services covering the region/information that has been selected, and downloads the requested flight data via the Internet 36 to server 44 which in turn transmits this information via data link 40 to the MFD 22 or Tablet PC 23.

The MFD 22 and/or Tablet PC 23 is provided with Services Activation Manager (SAM) software 27 that allows the customer to activate subscriptions to coverages of interest, and to purchase either yearly, monthly or on a one time basis, flight data using the MFD and/or Tablet PC 23 while onboard the aircraft 38. The SAM 27 can be loaded into the MFD 22 by the original equipment manufacturer 48 of the MFD 22, before the MFD 22 is shipped to an aircraft OEM 50. Alternatively, the aircraft OEM 50 may load the SAM 27 into the MFD and/or Tablet PC 23. Finally, the owner/operator 52 of the aircraft 38 may load the MFD and/or Tablet PC 23 with the SAM 27. The information service provider 20 may provide the SAM software 27 to the MFD OEM 48, aircraft OEM 50 or aircraft operator 52 in any of various media/form, such as a CD, a flash memory card, and downloadable application from the website 29.

Before the subscription is activated from the MFD 22 or Tablet PC 23, the dealer that sold the aircraft or the customer (e.g. pilot/navigator) that had the MFD 22 installed aftermarket is required to create a profile in the server 46 through the service provider's website 29. Alternatively, the profile data can be gathered over a phone call to the sales line of the Information Service Provider 20. The details of the profile may include, without limitation, the login information; credit card numbers and associated details; and, the serial number of the MFD 22 or Tablet PC 23 or alternatively, the tail number of the aircraft in which the MFD/Tablet PC is installed. As previously indicated, the SAM application software 27 can be sent to the customers by the service provider 20 in a media suitable to the MFD 22 or Tablet PC 23. The customer uses the media to load the SAM application 27 into the MFD 22 or Tablet PC 23. Alternatively, the SAM application software 27 can be preloaded into the MFD 22 or Tablet PC 23 by the MFD OEM 48 or the aircraft OEM 50. The 27 application software can also be downloaded from the website 29 and installed in the MFD 22 or Tablet PC 23.

The SAM application 27 can be launched by the customer from a menu button on the MFD 22 or Tablet PC 23. Upon launch, the 27 application automatically will read the Serial Number of the MFD 22 or Tablet PC 23. If automatic reading of the Serial Number is not possible for a given hardware, then the user may touch screen or dial the characters into the SAM application 27. When additional flight data services are offered by the service provider 20, the SAM 27 resident on the MFD 22 or Tablet PC 23 can be updated via the Wi-Fi data link 40 as part of a handshake between the SAM 27 and the website server 31 using Internet 36 and the ground based LAN 45. All messages sent by the SAM 27 running on the MFD 22 or Tablet PC 23 possess fields appropriate to each message type, including the type/model of MFD system, the Serial Number of the MFD 22 or Tablet PC 23, SAM version number and sales catalog version number that is currently loaded into the MFD 22 (or Tablet PC). In this manner, the service provider's subscription/data server 46 can determine the specific services that need to be pushed to the MFD 22 or Tablet PC 23 for particular aircraft 38.

As previously indicated, the data services pushed to the MFD 22 or Tablet PC 23 from server 46 extend only to the coverages requested by the customer or allowed for the type/model of MFD 22 or Tablet PC 23. Thus, the data services pushed to the MFD 22 by server 46 will typically include a description, item number and the maximum geographic coordinates of the rectangular area under which the service is effective. It should be noted here that most currently available MFDs 22 and Tablet PCs include a built in zoom function that allows the selection of a specific geographic region, such as region 32 shown on map 30 in FIG. 2. Keys 26 can be used to type in specific characters as part of the selection process. Based on the type/model of MFD 22, the SAM 27 resident on the MFD 22 may be preprogrammed with standard coverages (charts and NAV DATA service descriptions and item numbers, including VFR [Visual Flight Rule] coverages) that are offered as standard services from the service provider 20.

The SAM 27 on the MFD 22 utilizes the coordinates of the rectangular region 32 selected by the customer on the MFD 22 and uses these coordinates to determine the list of chart and NAV DATA services that are available within the selected region. These services may be displayed as a list on the MFD 22, allowing the customer to select one or more desired services.

For selected coverages, the SAM 27 may request that the customer choose a time frame for the selected subscription services, such as a yearly subscription, a monthly subscription, a number of updates, or a one time purchase, as well as the mode of payment. In response to these customer selections, the SAM 27 will connect to the service provider's server 46 and send the subscription request message which includes the MFD serial number, coverages selected, subscription type and payment mode. Upon receipt of this information by server 46, the order is processed by the service provider 20.

After the service provider 20 completes the order, a confirmation may be returned within a short interval by server 46 to the MFD 22. This confirmation may include the total amount billed for the requested services and the corresponding available dates for the selective services. The SAM software 27 may display the result of the order processing on the MFD 22 and send an initial service request to the server 46 to receive and load on the MFD 22 the initial data set for the corresponding coverages whose available dates fall on or before the current date. Alternatively, the SAM 27 may display all the available coverages (rather than asking the customer to draw a rectangle) for a particular MFD system and then proceed with loading of the selected coverages.

The initial data set may be automatically pushed to the MFD 22 upon receipt of an initial service request from the SAM application 27. This message may include the MFD serial number and the item numbers of coverages subscribed.

Since the SAM 27 knows the available date for each service revision, the SAM 27 may be programmed to send a revision service request on or after the available date, if the revision is yet to be received by the SAM 27 and if the MFD 22 comes into range of the data link 40 at the airport 34. The message may include the MFD serial number and the item numbers of coverages subscribed for which the data set is available for download. Upon receipt of the revision service request by server 46, the revision data sets will be automatically pushed to the MFD 22.

In those applications where an aircraft 38 may be operated by several pilots within an aircraft operator organization, the SAM 27 may permit different users of the same MFD system to purchase and activate different flight data item numbers of interest by using the Login ID and Password mechanism (customer will either touch screen or dial the characters for the two fields) discussed below. Accordingly, users of the aircraft 30 can, using the SAM application 27, view the active list of subscriptions (having corresponding item numbers) and the details that pertain to the particular MFD 22.

Figure 3:
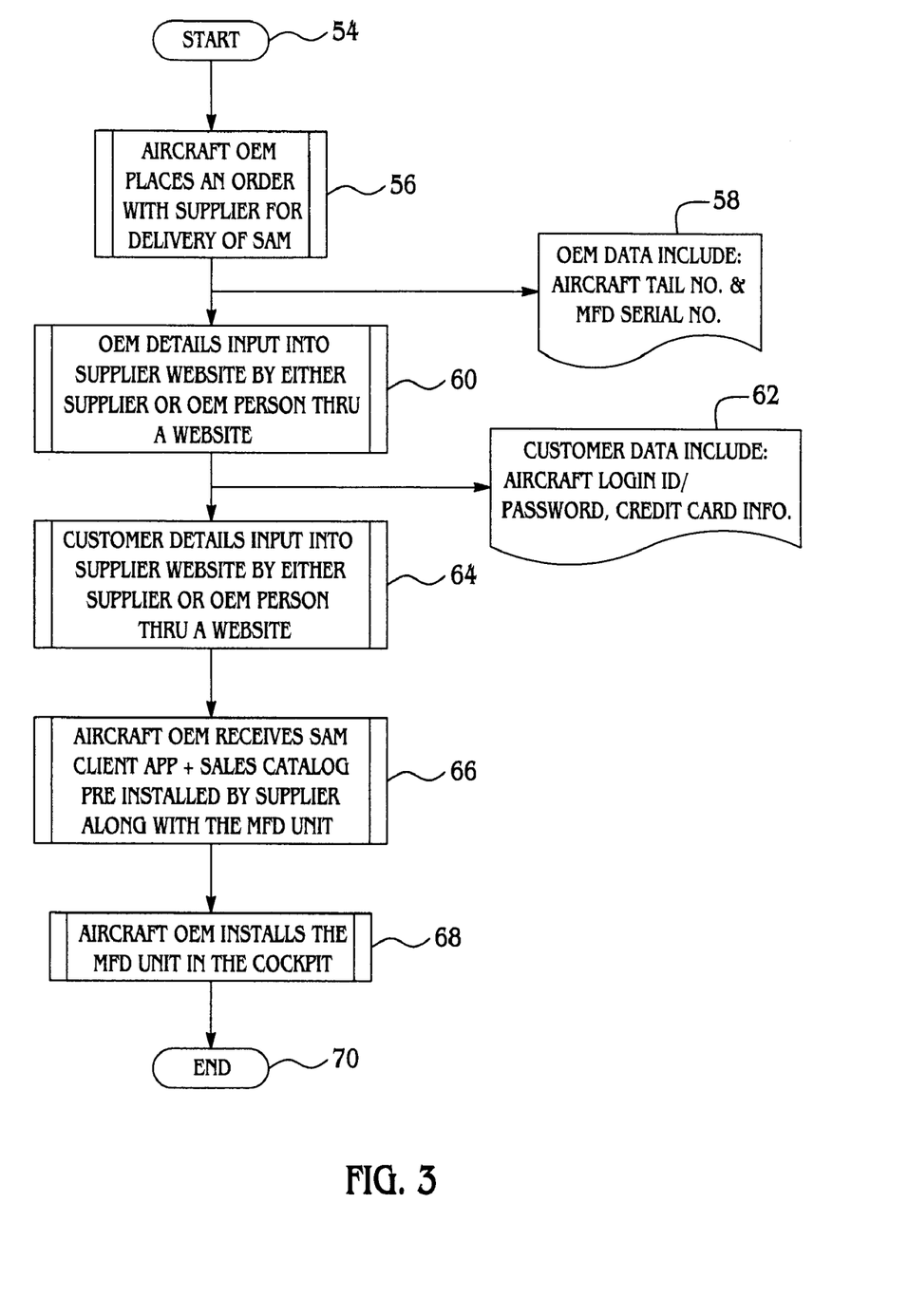
FIG. 3 is a flow chart showing the steps used for installing the services activation manager software in an MFD onboard an aircraft.

Attention is now directed to FIG. 3, where the steps are shown for installing an MFD 22 in an aircraft cockpit running a SAM application 27. In this example, the MFD 22 is installed by the aircraft OEM 50. After starting the process at 54, the first step 56 involves the aircraft OEM 50 placing an order with the information service provider 20 for delivery of the SAM application 27. As shown at 58, the aircraft OEM 50 provides the service provider 20 with the serial number of the MFD 22 in which the ordered SAM application 27 is to be installed.

At step 60, the aircraft OEM 50 inputs additional details to the service provider's website 29. This can be accomplished either by the service provider 20 or personnel at the aircraft OEM 50, using a webpage. The information provided in step 60 includes, as shown at 62, customer data such as name, address, email address, phone number, login ID/password, credit card information, etc. At step 64, the customer details input information to the service provider's website 29. This may be accomplished either by the service provider or OEM personnel through a webpage. At step 66, the aircraft OEM receives the SAM application 27 from the service provider 20, along with a sales catalog pre-installed by the service provider 20 in the MFD 22. At step 68, the aircraft OEM 50 installs the MFD unit 22 into the cockpit of the aircraft 28, and the installation process is completed at 70.

Figure 4:
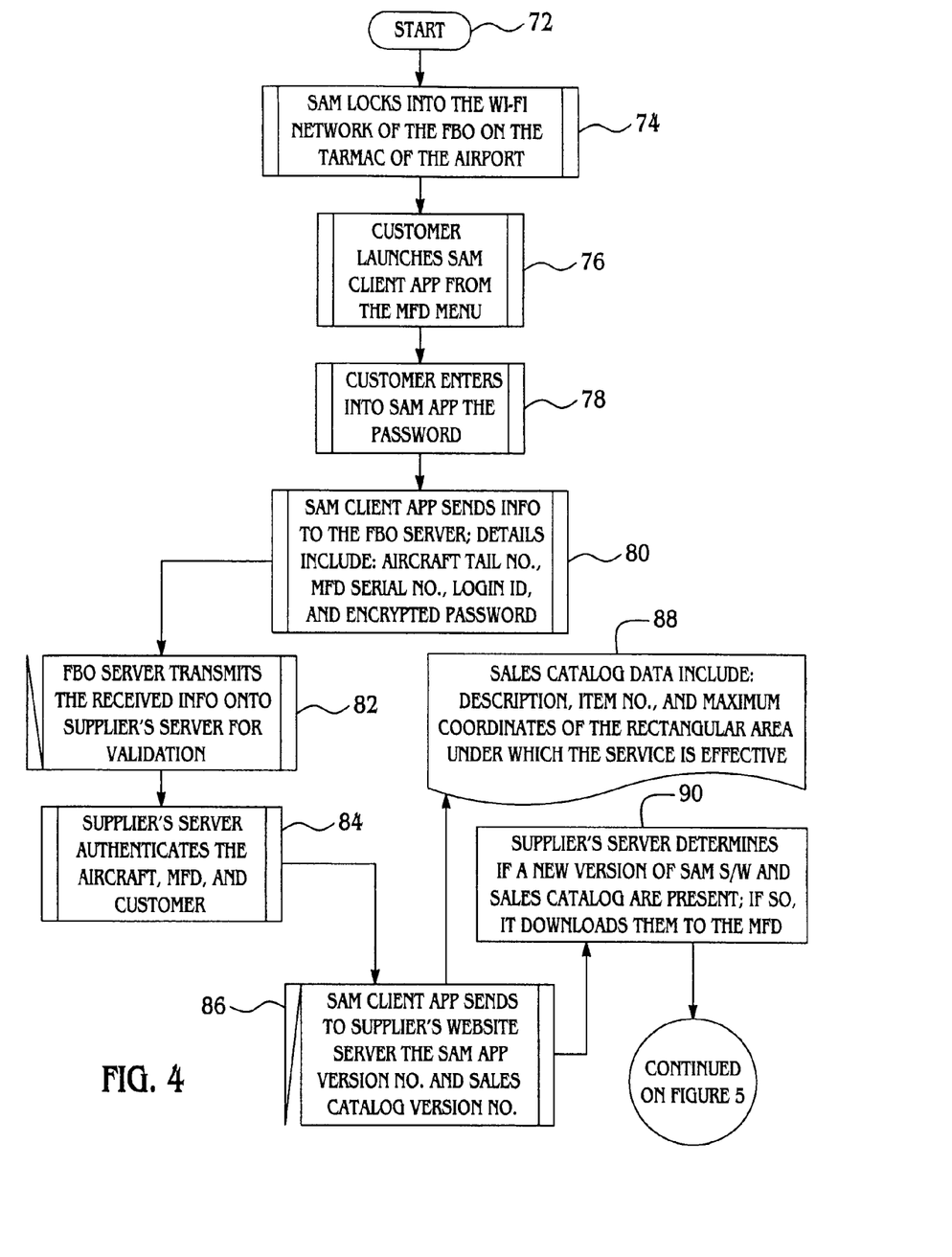
FIGS. 4-6, taken together, form a flow chart illustration of the steps used in authenticating customers, initiating flight data service requests and automatically downloading of data to an MFD.

FIG. 4 depicts the steps for authenticating the use of an SAM application 27 by a customer. The process starts at 72. At 74, the SAM 27 locks onto the Wi-Fi data link 40 of the airport or FBO 34 on the tarmac of the airport. At step 76, the customer launches the SAM client application 27 from a menu on the MFD 22. At step 78, the customer enters the appropriate login id and password into the SAM application 27. Next, at step 80, the SAM application 27 sends to the airport server 44 information which includes MFD serial number, login ID and encrypted password.

Next, at step 82, the airport server 44 transmits the received information via Internet 36 to the service provider's server 46 for validation. At 84, server 46 authenticates the MFD and customer. Next, at step 86, the SAM application 27 sends information to the server 46 that includes the SAM application version number and sales catalog version number. As shown at 88, the sales catalog data may include a description, item numbers and maximum coordinates of the rectangular area to which the service coverage applies. Next, at step 90, server 46 determines if a new version of the SAM 27 and sales catalog are present in the server; if so, then the server 46 downloads them to the MFD 22. It should be noted here that only the item numbers of service coverages that apply to the type/model of MFD 22 may be downloaded.

Figure 5:
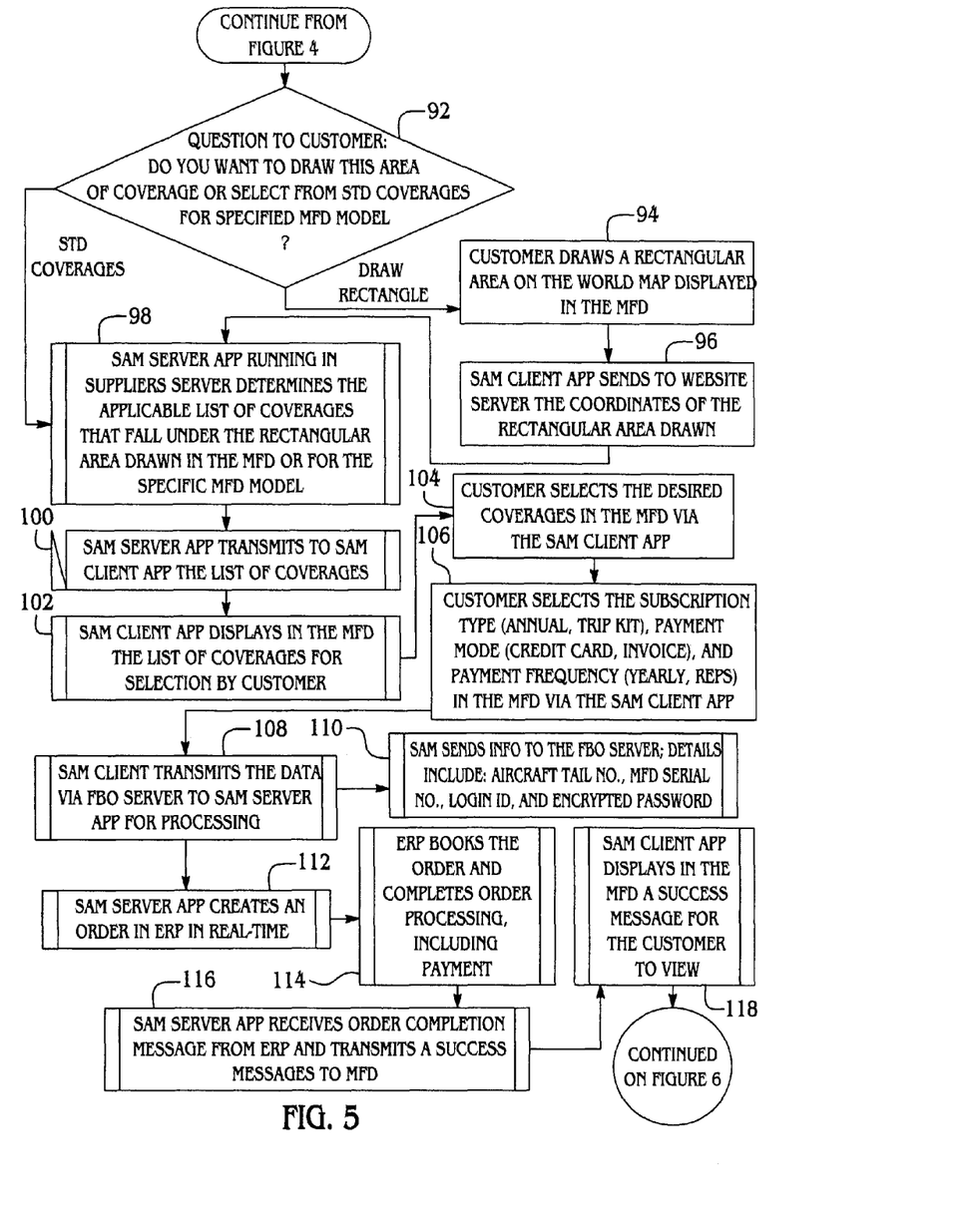

The process continues in the flow chart shown in FIG. 5 which details the steps followed by the customer in purchasing the desired coverages using the MFD 22 running the SAM application 27. At step 92, the customer is presented with the question of whether he wishes to draw an area of coverage, or select from standard coverages available for a particular type/model of MFD 22. If the customer elects standard coverages, then at step 98 server 46 determines the applicable list of coverages that are available for the specific MED type/model used by the customer. However, if the customer elects to draw a rectangle to define the area of coverage, then at step 94 the customer uses the MED 22 to draw a rectangular area on a world map displayed on the MFD 22.

At 96, the SAM 27 sends the coordinates of the rectangular area, the type/model of MFD 22, and the Serial Number of MFD 22 to the service provider's server 46. Although not shown in the drawings, following step 96, the customer may confirm the coverages and may be allowed to modify the selected area if the selection was not what intended to be selected by the customer. At step 98, server 46 determines the applicable list of coverages that fall within the rectangular area drawn by the customer in step 94. At step 100, server 46 transmits the list of coverages to the SAM 27 on the MFD 22. At step 104, the customer selects the desired coverages in the MFD 22 using the SAM 27. At step 106, the customer selects the subscription type (e.g. annual, monthly, or single trip kit), and payment mode using the MFD 22 and the SAM 27. At 108, the SAM 27 transmits data to server 46 to initiate processing of the request. The details of step 108 are shown at 110 in which the SAM 27 sends the information to the airport server 44, including MFD serial number, login ID encrypted password, item numbers selected, subscription type, and payment mode. Next, at step 112, server 46 creates an order in the service provider's ERP in real-time. As shown at 114, the ERP books the order and completes the order processing, including payment. At step 116, the service provider's server 46 receives an order completion message from the ERP and transmits a success message to the MFD 22. At step 118, the SAM 27 displays in the MFD 22 a success message for the customer to view.

Figure 6:
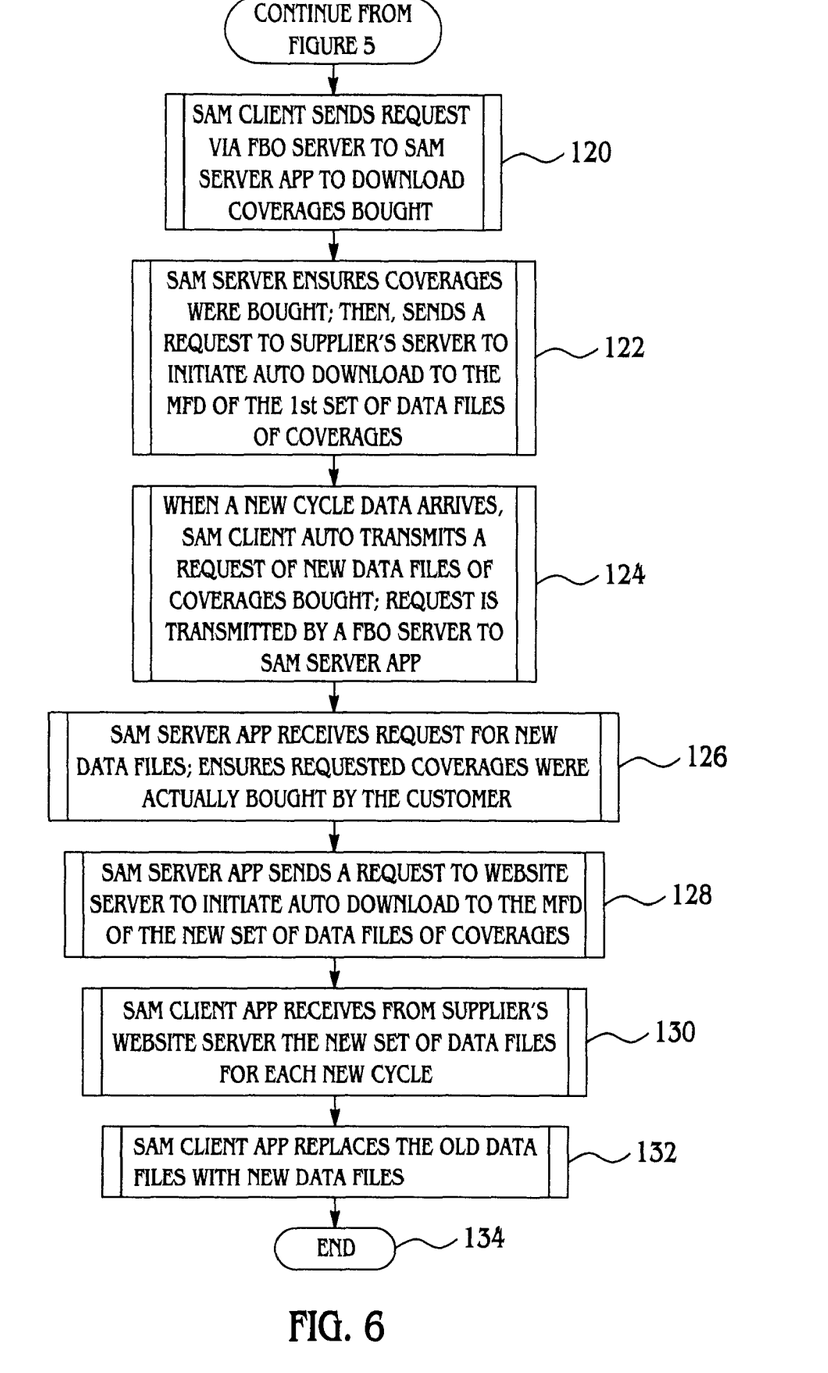

The process continues in FIG. 6 which shows more particularly how coverages are automatically downloaded to the MFD 22 for each cycle when the SAM 27 locks onto the Wi-Fi data link 40 of the airport or FBO 34 on the tarmac of the airport. At step 120, the SAM 27 sends, based on the available dates, a request containing the Serial Number of the MFD 22 via server 44 to the service provider server 46 to download the coverages that have been purchased. At 122, server 46 verifies that the coverages were purchased and then sends a request to initiate automatic download to the MFD 22 of the first set of data files of coverages that have been purchased. At 124, when a new cycle data arrives, the SAM 27 automatically transmits a request for new data files of coverages that have been previously purchased. This request is transmitted via server 44 to server 46. At step 126, server 46 receives the request for the new data files and verifies the requested coverages were actually purchased by the customer. Then, at step 128, server 44 sends a request to server 46 to initiate automatic downloading to the MFD 22 of the newest set of data files of coverages. At step 130, the SAM 27 receives from server 46 the new set of data files for each new cycle. Finally, at step 132, SAM 27 replaces the old data files with the new data files, and the process ends at 134.

In some applications, it may be desirable to control access to the data that has been previously ordered and downloaded onto to a particular MFD 22. In order to provide such access control, when the pilot wishes to access data in an area of coverage in order to aid in navigating the aircraft, the SAM 27 application may require the user to login. Upon login by the pilot, the SAM 27 application sends to the servers 31 and 46 the login id/password and MFD serial number. The Server 46 verifies the authentication of both the pilot and the MFD 22, and then transmits back to the MFD 22 the subscribed item numbers applicable to the pilot's login ID that were previously downloaded automatically to the MFD 22. The SAM 27 application receives the item numbers and displays the corresponding description of the coverages. The SAM 27 application then allows the pilot to choose any of the already downloaded coverages for viewing on the MFD in order to help the pilot navigate the aircraft.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of installing flight data in a cockpit device on-board an aircraft, comprising the steps of:
   (A) transmitting a request for flight data comprising an on-demand flight data subscription from a flight data service provider, said transmitting from the cockpit device on-board the aircraft to a local area network at the airport, said aircraft at the airport, said flight data comprising at least one of navigational charts, airport information, weather information, and scheduling data;
   (B) transmitting the request from the local area network to said flight data service provider;
   (C) transmitting the flight data from the flight data service provider to the local area network; and,
   (D) transmitting the flight data transmitted in step (C) to the cockpit device using the local area network, and displaying said flight data selected by a cockpit device user on the cockpit device.

2. The method of claim 1, wherein steps (A) and (D) are each performed using a wireless data link conforming to IEEE 802.

3. The method of claim 1, further comprising the step of:
   (E) selecting a geographic region to which the flight data pertains, and
   wherein the request transmitted in step (A) includes an identification of the geographic region selected in step (E).

4. The method of claim 3, wherein step (E) is performed on-board the aircraft.

5. The method of claim 3, wherein step (E) is performed using a geographic map presented by an electronic display.

6. The method of claim 1, wherein step (B) is performed using the Internet.

7. The method of claim 1, wherein step (A) is performed using one of a multi-functional display device and a portable personal computer.

8. The method of claim 1, further comprising the steps of:
   (E) registering the cockpit device with the service provider;
   (F) installing flight data service software application on the registered cockpit device; and,
   (G) using the software application to generate the request transmitted in step (A).

9. The method of claim 8, wherein step (F) is performed by the original equipment manufacturer of the cockpit device.

10. The method of claim 8, wherein step (F) is performed by the original equipment manufacturer of the aircraft in which the cockpit device is installed.

11. The method of claim 8, wherein step (E) includes providing the service provider with an identification number associated with the cockpit device.

12. The method of claim 8, wherein step (E) is performed using the cockpit device.

13. The method of claim 1, further comprising the steps of:
   (E) registering a user with the flight data service provider;
   (F) log-in by the user to request use of the flight data transmitted in step (D); and,
   (G) verifying that the user logging on in step (F) has been registered in step (A).

14. A method of providing flight data subscription service to aircraft, comprising the steps of:
   (A) registering a cockpit device on-board an aircraft with a flight data service provider, said flight data comprising at least one of navigational charts, airport information, weather information, and scheduling data;
   (B) using the cockpit device to generate a request for flight data comprising an on-demand subscription, said request from said aircraft on the ground;
   (C) transmitting the request generated in step (B) to a local area network on the ground;
   (D) forwarding the request from the local area network to the flight data service provider;
   (E) transmitting, in response to the request forwarded in step (D), the requested flight data from the flight data service provider to the local area network; and,
   (F) transmitting the requested flight data from the local area network to the cockpit device, and displaying data selected by a cockpit device user on the cockpit device.

15. The method of claim 14, wherein the device is a multifunctional display.

16. The method of claim 14, wherein step (A) is performed by the original equipment manufacturer of the device.

17. The method of claim 14, wherein step (A) is performed by the manufacturer of the aircraft.

18. The method of claim 14, wherein steps (C) and (E) are each performed using a wireless data link.

19. The method of claim 14, wherein step (D) is performed using the Internet.

20. The method of claim 14, wherein step (B) includes:
displaying a geographic map on the device,
selecting an area on the displayed map for which data services are desired, and
including an identification of the selected map area in the request.

21. The method of claim 14, including the steps of:
(G) installing a flight data service software application on the registered device; and,
(H) using the software application to generate the request in step (B).

22. A method of providing flight data to a cockpit device on-board an aircraft, comprising the steps of:
receiving a request for flight data comprising an on-demand flight data subscription from a cockpit device on-board an aircraft, said receiving being done by a flight data service provider;
registering the cockpit device by the flight data service provider; and
transmitting said requested flight data to the cockpit device for displaying of said requested flight data.

* * * * *